United States Patent

Oshio et al.

[11] Patent Number: 6,054,545
[45] Date of Patent: Apr. 25, 2000

[54] MODIFIED CELLULOSE COMPOUND AND PHOTOPOLYMERIZABLE RESIN COMPOSITION CONTAINING THE SAME

[75] Inventors: Kiminori Oshio; Hiroyuki Obiya, both of Kanagawa, Japan

[73] Assignee: Tokyo Ohka Kogyo Co., Ltd., Kanagawa, Japan

[21] Appl. No.: 09/124,054

[22] Filed: Jul. 29, 1998

[30] Foreign Application Priority Data

Jul. 29, 1997  [JP]  Japan .................................. 9-218038

[51] Int. Cl.$^7$ ........................................ G03F 7/027
[52] U.S. Cl. .............................. 527/301; 536/32; 522/88; 522/89
[58] Field of Search ........................... 527/301; 536/32; 522/88, 89

[56] References Cited

U.S. PATENT DOCUMENTS

| 4,565,857 | 1/1986 | Grant | 527/301 |
| 4,656,202 | 4/1987 | Nason et al. | |
| 5,010,155 | 4/1991 | Mueller | 527/301 |
| 5,157,093 | 10/1992 | Harisiades et al. | 527/301 |

FOREIGN PATENT DOCUMENTS 0 321 882  6/1989  European Pat. Off. .

*Primary Examiner*—Nathan M. Nutter
*Attorney, Agent, or Firm*—Sughrue, Mion, Zinn Macpeak & Seas, PLLC

[57] ABSTRACT

A modified cellulose compound and a photopolymerizable resin composition containing the same are disclosed, the modified cellulose compound being obtained by reacting a hydroxyl group of cellulose or a cellulose derivative with an isocyanate group of a specific (meth)acryloyloxyalkylene isocyanate compound. The photopolymerizable resin composition has excellent adhesion to a substrate and high flexibility, and the modified cellulose compound has properties of easily decomposing and volatilizing even after baking.

8 Claims, 1 Drawing Sheet

MODIFIED CELLULOSE COMPOUND AND PHOTOPOLYMERIZABLE RESIN COMPOSITION CONTAINING THE SAME

FIELD OF THE INVENTION

The present invention relates to a modified cellulose compound and a photopolymerizable resin composition containing the same. More particularly, it relates to a modified cellulose compound which provides a photopolymerizable resin composition having photocurability, excellent adhesion to a substrate and high flexibility, and which, even when baked, retains liability to decomposition and volatilization; and to a photopolymerizable resin composition containing the modified cellulose compound. The modified cellulose compound of the present invention is applicable to a photopolymerizable resin composition useful for an ultraviolet curing coating, a photoresist for a screen printing plate, a photoresist for lift-off, and for the formation of priming ribs of a plasma display panel (hereinafter abbreviated PDP), resisting patterns and conductive patterns, and the like.

BACKGROUND OF THE INVENTION

Coating compositions containing cellulose derivatives typically exemplified by methyl cellulose, hydroxyethyl cellulose, hydroxypropyl cellulose, hydroxymethylpropyl cellulose, and carboxymethyl cellulose have been widely used as an emulsion coating, a paper coating, various adhesives, an ultraviolet curing coating, a photoresist for screen printing, a photoresist for lift-off, a pasty composition, and the like. However, the coating film formed by applying these compositions to a substrate and drying lacks water resistance and tends to come off the substrate due to poor adhesion.

In order to solve the above problems, a cellulose derivative having a specific average degree of substitution by a specific substituent per unit glucose ring and having the hydrogen atom of the residual hydroxyl groups substituted with an N-methyleneacrylamide group has been proposed (see JP-A-2-298501, the term "JP-A" means an "unexamined published Japanese patent application"). It has been still desired to develop a cellulose compound having improvements in adhesion to a substrate, flexibility, and decomposability or volatilizability when baked.

SUMMARY OF THE INVENTION

An object of the present invention is to provide a modified cellulose compound which provides a photopolymerizable resin composition having excellent adhesion to a substrate and high flexibility, exhibits decomposability or volatilizability even after being baked, and is applicable to a photopolymerizable resin composition used for an ultraviolet curing coating, a photoresist for screen printing or lift-off, for the formation of a priming rib of PDP, a resisting pattern or a conductive pattern or the like.

As a result of extensive investigations, the inventors of the present invention have found that the above problems can be solved by using a modified cellulose compound obtained by reacting a hydroxyl group of cellulose or a cellulose derivative with an isocyanate group of a specific isocyanate compound. The present invention has been completed based on this finding.

The present invention relates to a modified cellulose compound obtained by reacting a hydroxyl group of cellulose or a cellulose derivative with an isocyanate group of a compound represented by formula (I):

$$CH_2=CR^1-COO-R^2-NCO \qquad (I)$$

wherein $R^1$ represents a hydrogen atom or a methyl group; and $R^2$ represents an alkylene group having 1 to 5 carbon atoms which may have alkyl group(s) as side chain(s).

The present invention also relates to a photopolymerizable resin composition comprising (a) the above-mentioned modified cellulose compound and (b) a photopolymerization initiator.

The photopolymerizable resin composition preferably contains (c) an ethylenic compound and/or (d) inorganic powder.

DETAILED DESCRIPTION OF THE INVENTION

Figure 1:
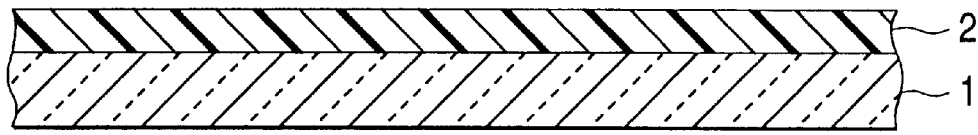
FIGS. 1(a) to (c) are diagrams schematically illustrating the pattern formation with the photopolymerizable resin composition according to the present invention.
Figure 1:
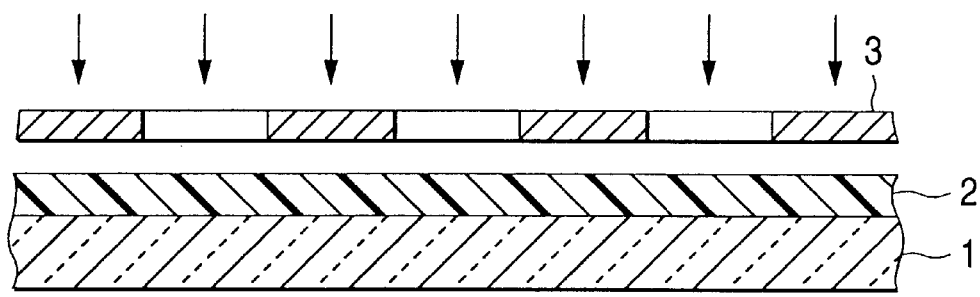
Figure 1:
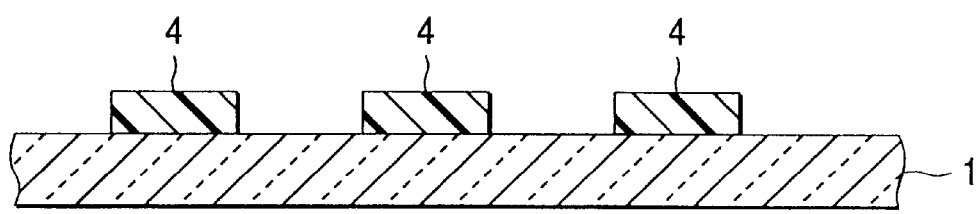

The modified cellulose compound according to the present invention is a compound obtained by reacting a hydroxyl group of cellulose or a cellulose derivative with an isocyanate group of a compound represented by formula (I).

Examples of the cellulose or cellulose derivative as a precursor of the modified cellulose compound include cellulose, carboxymethyl cellulose, hydroxyethyl cellulose, hydroxypropyl cellulose, methyl cellulose, ethyl cellulose, propyl cellulose, ethylhydroxyethyl cellulose, hydroxymethylethyl cellulose, hydroxymethylpropyl cellulose, carboxymethylethyl cellulose, and cellulose acetate phthalate. These precursor compounds can be used either individually or as a combination of two or more thereof. Modified cellulose compounds prepared by starting with one or more compounds selected from methyl cellulose, ethyl cellulose, propyl cellulose, and hydroxypropyl cellulose are preferred for their dispersing properties for inorganic powder, such as fluorescent substances, and processability in sand blasting for pattern formation.

The reaction between the residual hydroxyl groups of the cellulose or cellulose derivative and the isocyanate group of an isocyanate compound of formula (I) can be carried out by, for example, reacting the two compounds in a reactor at 60 to 90° C. for 2 to 24 hours in the presence of a catalyst, such as an organometallic compound (e.g., organotin compound) and an organic amine compound.

The reaction proportion of the hydroxyl group contained in the cellulose or cellulose derivative and the isocyanate group is such that the isocyanate group is preferably from 0.1 to 0.8 equivalent, more preferably from 0.2 to 0.6 equivalent, per one equivalent of the hydroxyl group. If the isocyanate group is less than 0.1 equivalent, the resulting modified cellulose compound may cause reduced adhesion to a substrate and a reduced photocurability. If it exceeds 0.8 equivalent, the resulting compound tends to have reduced storage stability.

The term "hydroxyl group" as referred to above is intended to include a modified hydroxyl group, e.g., an etherified hydroxyl group present in a cellulose derivative.

The resulting modified cellulose compound, which comprises a cellulose skeleton as the main chain and a specific isocyanate compound residue introduced to its side chain, provides a photopolymerizable resin composition which has high sensitivity, markedly improved elasticity and flexibility, and satisfactory adhesion to a substrate, and maintains decomposability or volatilizability even when baked. Therefore, it is suited for application to a photopolymerizable resin composition useful as an ultraviolet curing coating or a photoresist for screen printing or lift-off or in the formation of priming ribs of PDP, a resisting pattern or an electrically conductive pattern.

The modified cellulose compound preferably has a weight average molecular weight of 8,000 to 500,000, still preferably 10,000 to 300,000, particularly preferably 50,000 to 150,000. If the molecular weight is less than 8,000, the film forming properties tend to be insufficient. If it is more than 500,000, the viscosity undesirably increases.

In the isocyanate compound of formula (I), examples of the alkylene group represented by $R^2$ include a methylene group, an ethylene group, a propylene group, an isopropylene group, a butylene group, a t-butylene group, and a pentylene group, with an ethylene group being preferred. The alkylene group represented by $R^2$ may have one or plural alkyl groups (preferably an alkyl group having 1 to 3 carbon atoms) as side chain(s).

Specific examples of the isocyanate compound represented by formula (I) include acryloyloxyethylene isocyanate, acryloyloxypropylene isocyanate, acryloyloxyisopropylene isocyanate, acryloyloxybutylene isocyanate, methacryloyloxyethylene isocyanate, methacryloyloxypropylene isocyanate, methacryloyloxyisopropylene isocyanate, and methacryloyloxybutylene isocyanate. They can be used either individually or as a combination of two or more thereof. In particular, modified cellulose compounds obtained by using methacryloyloxyethylene isocyanate are preferred for their high superiority in adhesion to a substrate and flexibility.

The photopolymerizable resin composition of the present invention preferably contains 40 to 99 parts by weight of the modified cellulose compound as component (a) per 100 parts by weight of the photopolymerizable resin composition. If the proportion of component (a) is less than 40 parts by weight, where the composition further comprises an ethylenic compound as component (c) as hereinafter described, the relative proportion of component (c) becomes too large. As a result, stickiness may be generated, or the coating film tends to be brittle. If the proportion of component (a) exceeds 99 parts by weight, the curability or the film forming properties tend to be reduced.

The photopolymerization initiator as component (b) is not particularly limited. Suitable initiators include 1-hydroxycyclohexyl phenyl ketone, 2,2-dimethoxy-1,2-diphenylethan-1-one, 2-methyl-1-[4-(methylthio)phenyl]-2-morpholinopropan-1-one, 2-benzyl-2-diemthylamino-1-(4-morpholinophenyl)-butan-1-one, 2-hydroxy-2-methyl-1-phenylpropan-1-one, 2,4,6-trimethylbenzoyldiphenylphosphine oxide, 1-[4-(2-hydroxyethoxy)phenyl]-2-hydroxy-2-methyl-1-propan-1-one, 2,4-diethylthioxanthone, 2-chlorothioxanthone, 2,4-dimethylthioxanthone, 3,3-dimethyl-4-methoxybenzophenone, benzophenone, 1-chloro-4-propoxythioxanthone, 1-(4-isopropylphenyl)-2-hydroxy-2-methylpropan-1-one, 1-(4-dodecylphenyl)-2-hydroxy-2-methylpropan-1-one, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 2-ethylhexyl 4-dimethylaminobenzoate, 2-isoamyl 4-dimethylaminobenzoate, 2,2-diethoxyacetophenone, benzyl dimethyl ketal, benzyl β-methoxyethyl acetal, 1-phenyl-1,2-propanedione-2-(o-ehtoxycarbonyl) oxime, methyl o-benzoylbenzoate, bis(4-dimethylaminophenyl) ketone, 4,4'-bisdiethylaminobenzophenone, 4,4'-dichlorobenzophenone, benzil, benzoin, benzoin methyl ether, benzoin ethyl ether, benzoin isopropyl ether, benzoin n-butyl ether, benzoin isobutyl ether, benzoin butyl ether, p-dimethylaminoacetophenone, p-tert-butyltrichloroacetophenone, p-tert-butyldichloroacetophenone, thioxanthone, 2-methylthioxanthone, 2-isopropylthioxanthone, dibenzosuberone, α,α-dichloro-4-phenoxyacetophenone, and pentyl 4-dimethylaminobenozate. These initiators can be used either individually or as a combination of two or more thereof. Preferred among them are 2,4,6-trimethylbenzoyldiphenylphosphine oxide and 2,4-diethylthioxanthone.

The photopolymerization initiator is preferably used in a proportion of 0.1 to 25 parts by weight per 100 parts by weight of the modified cellulose compound. If the proportion is less than 0.1 part by weight, undercuring tends to result. If it exceeds 25 parts by weight, the composition tends to have reduced film forming properties, and the coating film of the composition tends to have reduced abrasion resistance or chemical resistance.

In order to improve the sensitivity and chemical resistance of the photopolymerizable resin composition, the composition can further comprise an ethylenic compound as component (c), which has at least one addition-polymerizable ethylenically unsaturated double bond and undergoes addition polymerization by the action of the photopolymerization initiator on irradiation with energy rays to cure.

Suitable ethylenic compounds include unsaturated carboxylic acids, esters of an aromatic (poly)hydroxy compound and an unsaturated carboxylic acid, esters obtained by esterification between an unsaturated carboxylic acid and a polycarboxylic acid and a polyhydroxy compound (e.g., aliphatic or aromatic polyhydroxy compounds), unsaturated carboxylic acid amides, and unsaturated carbonitriles.

Specific examples of these ethylenic compounds include monofunctional monomers, such as methyl acrylate, methyl methacrylate, ethyl acrylate, ethyl methacrylate, isobutyl acrylate, isobutyl methacrylate, 2-hydroxyethyl acrylate, 2-hydroxyethyl methacrylate, ethylene glycol monomethyl ether acrylate, ethylene glycol monomethyl ether methacrylate, ethylene glycol monoethyl ether acrylate, ethylene glycol monoethyl ether methacrylate, glycerol acrylate, glycerol methacrylate, acrylamide, methacrylamide, acrylonitrile, methacrylonitrile, 2-ethylhexyl acrylate, 2-ethylhexyl methacrylate, benzyl acrylate, and benzyl methacrylate; and polyfunctional monomers, such as ethylene glycol diacrylate, ethylene glycol dimethacrylate, triethylene glycol diacrylate, triethylene glycol dimethacrylate, tetraethylene glycol diacrylate, tetraethylene glycol dimethacrylate, butylene glycol dimethacrylate, propylene glycol diacrylate, propylene glycol dimethacrylate, trimethylolethane triacrylate, trimethylolethane trimethacrylate, trimethylolpropane triacrylate, trimethylolpropane trimethacrylate, tetramethylolpropane tetraacrylate, tetramethylolpropane tetramethacrylate, pentaerythritol triacrylate, pentaerythritol trimethacrylate, pentaerythrifol tetraacrylate, pentaerythritol tetramethacrylate, dipentaerythritol pentaacrylate, dipentaerythritol pentamethacrylate, dipentaerythritol hexaacrylate, dipentaerythritol hexamethacrylate, 1,6-hexanediol diacrylate, 1,6-hexanediol dimethacrylate, cardoepoxy diacrylate, and cardoepoxy dimethacrylate. Additionally included are fumarates, maleates, crotonates or itaconates corresponding to the above-enumerated acrylates or methacrylates; acrylic acid, methacrylic acid, fumaric acid, maleic acid, crotonic acid, itaconic acid; hydroquinone monoacrylate, hydroquinone monomethacrylate, hydroquinone diacrylate, hydroquinone dimethacrylate, resorcin diacrylate, resorcin dimethacryalte, pyrogallol diacrylate, pyrogallol triacrylate; a condensate of acrylic acid, phthalic acid and diethylene glycol, a condensate of acrylic acid, maleic acid and diethylene glycol, a condensate of methacrylic acid, terephthalic acid and pentaerythritol, a condensate of acrylic acid, adipic acid, butanediol, and glycerol; ethylenebisacrylamide, ethylenebismethacrylamide; allyl esters such as diallyl phthalate; and divinyl phthalate.

Polymers obtained through polymer reaction between a polymer having in its side chain a reactive functional group, such as a hydroxyl group or a halogenated alkyl group (e.g., polyvinyl alcohol, poly(2-hydroxyethyl methacrylate), polyepichlorohydrin, etc.) and an unsaturated carboxylic acid (e.g., acrylic acid, methacrylic acid, fumaric acid, maleic acid, crotonic acid or itaconic acid) are also preferably used as component (c).

The ethylenic compounds can be used either individually or as a combination of two or more thereof. Of the above-described ethylenic compounds, monomers having an ethylenically unsaturated double bond, particularly acrylic ester monomers and methacrylic ester monomers, are preferred. The term "monomers" as used herein denotes not only monomers in the narrow sense of the word but dimers, trimers and oligomers.

The ethylenic compound is preferably used in an amount up to 150 parts by weight per 100 parts by weight of the modified cellulose compound. If the amount of component (c) exceeds 150 parts by weight, stickiness may be generated, or the film forming properties tends to be reduced.

The photopolymerizable composition of the invention can further comprise inorganic powder as component (d). Examples of useful inorganic powders include powder of borosilicate lead glass, borosilicate zinc glass or borosilicate bismuth glass (i.e., PbO—$SiO_2$ glass, PbO—$B_2O_3$—$SiO_2$ glass, ZnO—$SiO_2$ glass, ZnO—$B_2O_3$—$SiO_2$ glass, BiO—$SiO_2$ glass, and BiO—$B_2O_3$—$SiO_2$ glass); various powdered oxides such as cobalt oxide, iron oxide, chromium oxide, nickel oxide, copper oxide, manganese oxide, neodymium oxide, vanadium oxide, cerium oxide, cipec yellow, cadmium oxide, silica, and spinel; powdered metallic oxides of Na, K, Mg, Ca, Ba, Ti, Zr, Al, etc., and fluorescent powders, such as ZnO:Zn, $Zn_3(PO_4)_2$:Mn, $Y_2SiO_5$:Ce, $CaWO_4$:Pb, $BaMgAl_{14}O_{23}$:Eu, ZnS:(Ag, Cd), $Y_2O_3$:Eu, $Y_2Si\overline{O}_5$:Eu, $Y_3Al_5O_{12}$:Eu, $YBO_3$:Eu, (Y, Gd)$BO_3$:Eu, $GdBO_3$:Eu, $ScBO_3$:Eu, $LuBO_3$:Eu, $Zn_2SiO_4$:Mn, $BaAl_{12}O_{19}$:Mn, $SrAl_{13}O_{19}$:Mn, $CaAl_{12}O_{19}$:Mn, $YBO_3$:Tb, $BaMgAl_{14}O_{23}$:Mn, $LuBO_3$:Tb, $GdBO_3$:Tb, $ScBO_3$:Tb, $Sr_6Si_3O_3Cl_4$:Eu, ZnS:(Cu, Al), ZnS:Ag, $Y_2O_2$S:Eu, ZnS:Zn, (Y, Cd)$BO_3$:Eu, and $BaMgAl_{12}O_{23}$:Eu. Electrically conductive particles, such as iron, nickel, copper, aluminum, silver, and gold, can also be used for formation of electrically conductive patterns. These inorganic powders can be added either individually or as a combination of two or more thereof.

The inorganic powder as component (d) is preferably used in a proportion of 100 to 400 parts by weight per 100 parts by weight of the photopolymerizable resin composition. If the proportion of the inorganic powder is less than 100 parts by weight, the composition may have insufficient coating properties, or the coating film tends to shrink on baking. If it exceeds 400 parts by weight, the photocurability may be reduced.

If desired, the photopolymerizable resin composition can contain a polymeric binder conventionally used in photosensitive resin compositions as far as the effects of the present invention are not impaired. Useful polymeric binders include copolymers comprising monomers selected from acrylic acid, methacrylic acid, crotonic acid, maleic acid, methyl acrylate, methyl methacrylate, ethyl acrylate, ethyl methacrylate, propyl acrylate, propyl methacrylate, isopropyl acrylate, isopropyl methacrylate, N-butyl acrylate, N-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, benzyl acrylate, benzyl methacrylate, phenoxy acrylate, phenoxy methacrylate, isobornyl acrylate, isobornyl methacrylate, glycidyl methacrylate, styrene, acrylamide, methacrylamide, acrylonitrile, methacrylonitrile, etc.; polyester obtained by polycondensation of an unsaturated dicarboxylic acid (e.g., itaconic acid, propylidenesuccinic acid and ethylidenemalonic acid) and a dihydroxy compound; polyamide obtained by polycondensation of an unsaturated dicarboxylic acid (e.g., itaconic acid, propylidenesuccinic acid and ethylidenemalonic acid) and a diamine; phenol novolak epoxy acrylate, phenol novolak epoxy methacrylate, cresol novolak epoxy acrylate, cresol novolak epoxy methacrylate, bisphenol A epoxy acrylate, bisphenol S epoxy acrylate, urethane acrylate oligomers, and urethane methacrylate oligomers. Reaction products between the above-described epoxy (meth)acrylate and a polybasic acid anhydride are also useful. Suitable examples of the polybasic acid anhydride are hexahydrophthalic anhydride, 3-methylhexahydrophthalic anhydride, 4-methylhexahydrophthalic anhydride, 3-ethylhexahydrophthalic anhydride, 4-ethylhexahydrophthalic anhydride, tetrahydrophthalic anhydride, 3-methyltetrahydrophthalic anhydride, 4-methyltetrahydrophthalic anhydride, 3-ethyltetrahydrophthalic anhydride, 4-ethyltetrahydrophthalic anhydride, and maleic anhydride. Hexahydrophthalic anhydride and tetrahydrophthalic anhydride are preferably used.

A solvent can be added to the photopolymerizable resin composition to improve the coating properties. Suitable solvents include ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol dipropyl ether, propylene glycol monomethyl ether, propylene glycol monoethyl ether, propylene glycol monopropyl ether, propylene glycol monobutyl ether, propylene glycol dimethyl ether, propylene glycol diethyl ether, diethylene glycol monomethyl ether, diethylene glycol monoethyl ether, diethylene glycol monophenyl ether, diethylene glycol dimethyl ether, diethylene glycol diethyl ether, ethylene glycol monomethyl ether acetate, ethylene glycol monoethyl ether acetate, ethylene glycol monopropyl ether acetate, ethylene glycol monobutyl ether acetate, ethylene glycol monophenyl ether acetate, diethylene glycol monomethyl ether acetate, diethylene glycol monoethyl ether acetate, diethylene glycol monoporopyl ether acetate, diethylene glycol monobutyl ether acetate, diethylene glycol monopohenyl ether acetate, propylene glycol monomethyl ether acetate, propylene glycol monoethyl ether acetate, propylene glycol monopropyl ether acetate, 2-methoxybutyl acetate, 3-methoxybutyl acetate, 4-methoxybutyl acetate, 2-methyl-3-methoxybutyl acetate, 3-methyl-3-methoxybutyl acetate, 3-ethyl-3-methoxybutyl acetate, 2-ethoxybutyl acetate, 4-ethoxybutyl acetate, 4-propoxybutyl acetate, 2-methoxypentyl acetate, 3-methoxypentyl acetate, 4-methoxypentyl acetate, 2-methyl-3-methoxypentyl acetate, 3-methyl-3-methoxypentyl acetate, 3-methyl-4-methoxypentyl acetate, 4-methyl-4-methoxypentyl acetate, acetone, methyl ethyl ketone, diethyl ketone, methyl isobutyl ketone, ethyl isobutyl ketone, tetrahydrofuran, cyclohexanone, methyl propionate, ethyl propionate, propyl propionate, isopropyl propionate, methyl 2-hydroxypropionate, ethyl 2-hydroxypropionate, 2-hydroxy-2-methylpropionate, methyl 3-methoxypropionate, ethyl 3-methoxypropionate, ethyl 3-ethoxypropionate, ethyl 3-propoxypropionate, propyl 3-methoxypropionate, isopropyl 3-methoxypropionate, methyl lactate, ethyl lactate, propyl lactate, isopropyl lactate, butyl lactate, amyl lactate, ethyl ethoxylacetate, ethyl oxyacetate, methyl 2-hydroxy-3-methylbutanoate, methyl acetate, ethyl acetate, propyl acetate, isopropyl acetate, butyl acetate, isoamyl acetate, methyl carbonate, ethyl carbonate, propyl carbonate, butyl carbonate, methyl pyruvate, ethyl pyruvate, propyl pyruvate, butyl pyruvate, methyl acetoacetate, ethyl acetoacetate, benzyl methyl ether, benzyl ethyl ether, dihexyl ether, benzyl acetate, ethyl benzoate, diethyl oxalate, diethyl maleate, γ-butyrolactone, benzene, toluene, xylene, cyclohexanone, methanol, ethanol, propanol, butanol, hexanol, cyclohexanol, ethylene glycol, diethylene glycol, and glycerol.

The solvent can be used in an amount up to 2,000 parts by weight, preferably 1,000 parts by weight or less, per 100 parts by weight of the photopolymerizable resin composition.

If necessary, the photopolymerizable resin composition can contain crosslinking agents, sensitizers, thermal polymerization inhibitors, plasticizers, surface active agents, anti-foaming agents, and other additives.

Suitable crosslinking agents include a phosphoric acid condensation product of 3-methoxy-4-diazodiphenylamine sulfate and 4,4'-methoxydiphenyl ether.

Suitable sensitizers include xanthene dyes, such as Eosine B (C.I. 45400), Eosine J (C.I. 45380), alcohol-soluble eosine (C.I. 45386), Cyanosin (C.I. 45410), Rose Bengale, Erythrocin (C.I. 45430), 2,3,7-trihydroxy-9-phenylxanthen-6-one, and Rhodamine 6G; thiazine dyes, such as Thionine (C.I. 52000), Azure A (C.I. 52005), and Azure C (C.I. 52002); pyronine dyes, such as Pyronine B (C.I. 45005) and pyronine GY (C.I. 45005); and coumarin compounds, such as 3-acetylcoumarin and 3-acetyl-7-diethylaminocoumarin.

Suitable thermal polymerization inhibitors include hydroquinone, hydroquinone monoethyl ether, p-methoxyphenol, pyrogallol, catechol, 2,6-di-tert-butyl-p-cresol, and β-naphthol.

Suitable plasticizers include dioctyl phthalate, didodecyl phthalate, triethylene glycol dicaprylate, dimethyl glycol phthalate, tricresyl phosphate, dioctyl adipate, dibutyl sebacate, and glycerol triacetate.

Useful surface active agents include anionic, cationic or nonionic surface active agents.

Useful anti-foaming agents include silicone compounds and fluorine compounds.

The modified cellulose compound and the photopolymerizable resin composition containing it are suited for use as an ultraviolet curing coating and a photoresist for screen printing and lift-off. A paste pattern can be formed by applying the photopolymerizable resin composition containing the inorganic powder to a substrate by screen printing or the like coating method, drying the coating layer, exposing the coating layer through a negative mask, followed by developing, drying and baking. On the resulting insulating paste pattern are further provided a conductive paste pattern and an insulating paste pattern successively to produce a multilayer wiring pattern.

Pattern formation using the photopolymerizable resin composition of the present invention will be explained by referring to FIGS. 1(a) to (c). A solution of the photopolymerizable resin composition in a solvent is applied to a substrate 1 by spin coating or the like coating technique and dried to form a photoresist layer 2 (FIG. 1(a)). For manufacturing a liquid crystal panel, a glass substrate having a polarizer, if necessary, a black matrix layer and a color filter layer, and a transparent electrically conductive circuit layer is exemplified as a substrate.

The photoresist layer 2 is selectively exposed to light (arrows shown in FIG. 1(b)) through a prescribed negative mask pattern 3 using an apparatus which generates a low-pressure mercury lamp, a high-pressure mercury lamp, a chemical lamp or an excimer laser to such an extent as to form a negative image as shown in FIG. 1(b). The photopolymerizable resin composition in the irradiated area undergoes photopolymerization and turns insoluble in water, an aqueous alkali solution or an organic solvent. The exposed layer is then immersed in a developer whereby the non-irradiated area is selectively dissolved and removed to give a photoresist pattern 4 faithful to the mask pattern 3 (FIG. 1(c)).

The developer includes water; 1 to 10 wt % aqueous solutions of an alkali metal (e.g., lithium, sodium or potassium) hydroxide, carbonate, hydrogencarbonate, phosphate or pyrophosphate, a primary amine (e.g., benzylamine or butylamine), a secondary amine (e.g., dimethylamine, dibenzylamine or diethanolamine), a tertiary amine (e.g., trimethylamine, triethylamine or triethanolamine), a cyclic amine (e.g., morpholine, piperazine or pyridine), a polyamine (e.g., ethylenediamine or hexamethylenediamine), an ammonium hydroxide (e.g., tetraethylammonium hydroxide, trimethylbenzylammonium hydroxide or trimethylphenylbenzylammonium hydroxide), a sulfonium hydroxide (e.g., trimethylsulfonium hydroxide, diethylmethylsulfonium hydroxide or dimethylbenzylsulfonium hydroxide), choline, etc.; and an organic solvent, such as methanol, ethanol, propanol, butanol, methyl acetate, ethyl acetate, butyl acetate, acetone, methyl ethyl ketone, ethylene glycol monomethyl ether acetate, ethylene glycol monoethyl ether acetate, and propylene glycol monomethyl ether acetate.

If desired, for example, in the formation of priming ribs of PDP, the pattern is preferably baked at a temperature of 350 to 700° C. for about 0.5 to 8 hours. The modified cellulose compound of the photopolymerizable resin composition of the invention easily decomposes and volatilizes even after baking, and a pattern faithful to a mask pattern can be formed.

A conductive paste pattern and an insulating paste pattern are successively formed on the photoresist pattern thus formed to produce a multilayer wiring pattern.

The present invention will now be illustrated in greater detail with reference to Synthesis Example and Examples, but it should be understood that the present invention is not construed as being limited thereto. In Synthesis Examples 1 to 6 and Comparative Synthesis Example 1 cellulose urethane (meth)acrylate compounds (modified cellulose compounds) were synthesized. Unless otherwise noted, all the percents and parts are given by weight.

SYNTHESIS EXAMPLE 1

In a flask equipped with a condenser, a thermometer and a stirrer was charged 338.0 parts (1.00 equivalent) of hydroxypropyl cellulose (weight average molecular weight (Mw): about 60,000; number of moles of propylene oxide addition-reacted: 4.0; hydroxyl equivalent: 338.0), and 407.1 parts of diethylene glycol monoethyl ether acetate was added thereto to dissolve the hydroxypropyl cellulose at 30° C. To the solution was added dropwise 77.5 parts of a 50% solution of methacryloyloxyethylene isocyanate (isocyanate group equivalent: 0.25) in diethylene glycol monoethyl ether acetate with a syringe. After the addition, the mixture was further allowed to react for an additional 1 hour period.

The reaction mixture was cooled and filtered, and the resulting crude product was poured into hot water at 90° C. for washing, followed by drying to obtain a purified modified cellulose compound (A-1). Analysis of an aliquot of the resulting modified cellulose compound (A-1) with an IR spectrometer revealed that 0.25 equivalent of the hydroxyl groups had reacted with the isocyanate compound.

SYNTHESIS EXAMPLE 2

The procedure of Synthesis Example 1 was repeated, except for doubling the hydroxypropyl cellulose (from 338.0 parts to 676.0 parts (hydroxyl equivalent: 2.00)) and the diethylene glycol monoethyl ether acetate (from 407.1 parts to 814.2 parts), to obtain a modified cellulose compound (A-2), in which 0.125 equivalent of the hydroxyl groups had reacted with the isocyanate compound.

SYNTHESIS EXAMPLE 3

The procedure of Synthesis Example 1 was repeated, except for changing the amount of the hydroxypropyl cellulose from 338.0 parts to 236.6 parts (hydroxyl equivalent: 0.7) and changing the amount of the diethylene glycol monoethyl ether acetate from 407.1 parts to 285.0 parts, to obtain a modified cellulose compound (A-3), in which 0.357 equivalent of the hydroxyl groups had reacted with the isocyanate compound.

SYNTHESIS EXAMPLE 4

In a flask equipped with a condenser, a thermometer and a stirrer was charged 338.0 parts (1.00 equivalent) of hydroxyethyl cellulose (Mw: about 360,000; number of moles of ethylene oxide addition-reacted: 4.0; hydroxyl equivalent: 338.0), and 407.1 parts of diethylene glycol monoethyl ether acetate was added to dissolve the hydroxyethyl cellulose at 30° C. To the solution was added dropwise 77.0 parts of a 50% solution of methacryloyloxyethylene isocyanate (isocyanate group equivalent: 0.25) in diethylene glycol monoethyl ether acetate with a syringe. After the addition, the mixture was further allowed to react for an additional 1 hour period.

The reaction mixture was worked up in the same manner as in Synthesis Example 1 to obtain a purified modified cellulose compound (A-4). Analysis of an aliquot of the resulting modified cellulose compound (A-4) with an IR spectrometer revealed that 0.25 equivalent of the hydroxyl groups had reacted with the isocyanate compound.

SYNTHESIS EXAMPLE 5

In a flask equipped with a condenser, a thermometer and a stirrer was charged 338.0 parts (1.00 equivalent) of hydroxyethyl cellulose (Mw: about 12,000; number of moles of ethylene oxide addition-reacted: 4.0; hydroxyl equivalent: 338.0), and 407.1 parts of diethylene glycol monoethyl ether acetate was added to dissolve the hydroxyethyl cellulose at 30° C. To the solution was added dropwise 77.0 parts of a 50% solution of methacryloyloxyethylene isocyanate (isocyanate equivalent: 0.25) in diethylene glycol monoethyl ether acetate with a syringe. After the addition, the mixture was further allowed to react for an additional 1 hour period.

The reaction mixture was worked up in the same manner as in Synthesis Example 1 to obtain a purified modified cellulose compound (A-5). Analysis of an aliquot of the resulting modified cellulose compound (A-5) with an IR spectrometer revealed that 0.25 equivalent of the hydroxyl groups had reacted with the isocyanate compound.

SYNTHESIS EXAMPLE 6

The procedure of Synthesis Example 1 was repeated, except for replacing 77.5 parts of a 50% diethylene glycol monoethyl ether acetate solution of methacryloyloxyethylene isocyanate with 70.5 parts of a 50% diethylene glycol monoethyl ether acetate solution of acryloyloxyethylene isocyanate (isocyanate equivalent: 0.25), to obtain a modified cellulose compound (A-6), in which 0.25 equivalent of the hydroxyl groups had reacted with the isocyanate compound.

COMPARATIVE SYNTHESIS EXAMPLE 1

The procedure of Synthesis Example 1 was repeated, except for replacing 77.5 parts of a 50% diethylene glycol monoethyl ether acetate solution of methacryloyloxyethylene isocyanate with 50.5 parts of a 50% diethylene glycol monoethyl ether acetate solution of N-methylolacrylamide, to obtain a modified cellulose compound (B-1).

EXAMPLE 1

The following components (1) to (5) were thoroughly stirred and kneaded to prepare a photopolymerizable resin composition.

(1) Modified cellulose compound (A-1) 20 parts
(2) 2,4-Diethylthioxanthone 1 part
(3) 2,4,6-Trimethylbenzoyldiphenylphosphine oxide 3 parts
(4) PbO—ZnO—$B_2O_3$ glass powder 100 parts (average particle size: 10 $\mu$m)
(5) Dimethylbenzyl ketal (polymerization initiator) 0.3 part The photopolymerizable resin composition was applied to a glass substrate for PDP, on which a wiring pattern had been formed, to provide a dry thickness of 25 $\mu$m through a screen of 125 mesh/in. and dried at 80° C. for 1 hour. The coating layer was exposed to actinic energy rays of 150 mJ/cm$^2$ through a negative mask having a resolution of 100 $\mu$m pattern/100 $\mu$m space and then developed by spraying warm water at 60° C. for 30 seconds. The coating properties of the photopolymerizable resin composition and reduction in pattern thickness after exposure and development were observed. The results of the observation are shown in Table below.

The resulting glass substrate was baked in an electric oven at 540 to 560° C. for 5 hours to form priming ribs for PDP. Missing or peel-off or color change of the priming ribs was observed. Further, PDP was prepared by using the resulting glass substrate, and display unevenness of the pixels was evaluated. The results obtained are shown in Table.

EXAMPLES 2 TO 6 AND COMPARATIVE EXAMPLE 1

Glass substrates for PDP were prepared in the same manner as in Example 1, except for replacing 20 parts by weight of the modified cellulose compound (A-1) with 20 parts by weight of each of the modified cellulose compounds (A-2) (Example 2), (A-3) (Example 3), (A-4) (Example 4), (A-5) (Example 5), (A-5) (Example 6), and (B-1) (Comparative Example 1). Evaluation was made in the same manner as in Example 1. The results obtained are shown in Table.

TABLE

| Modified Cellulose Compound | Coating Properties | After Development Pattern Thickness Reduction | After Baking Missing or Peel-off of Priming Rib | Display Unevenness of PDP |
|---|---|---|---|---|
| A-1 (Example 1) | good | not observed | not observed | not observed |
| A-2 (Example 2) | good | not observed | not observed | not observed |
| A-3 (Example 3) | good | not observed | not observed | not observed |
| A-4 (Example 4) | good | not observed | not observed | not observed |
| A-5 (Example 5) | good | not observed | not observed | not observed |
| A-6 (Example 6) | good | not observed | not observed | not observed |
| B-1 (Compara. Example 1) | good | observed | observed | observed |

EXAMPLE 7

The following components (1) to (5) were mixed in a mixing machine for 1 hour, and the mixture was filtered through a glass filter of 70 μm to prepare a photopolymerizable resin composition.

(1) Modified cellulose compound (A-1) 50 parts
(2) Diemthylbenzyl ketal 2 parts
(3) Ultraviolet absorber (ZAROORU, produced by 0.05 part Shonan Kagakusya K.K.)
(4) Triethylene glycol dimethacrylate 2.5 parts
(5) Ethylene glycol monobutyl ether acetate 50 parts The photopolymerizable resin composition was applied to a framed screen gauze of 180 mesh/in. to a dry thickness of 25 μm and dried at 60° C. for 40 minutes. A 10% aqueous solution of polyvinyl alcohol (EG40, produced by The Nippon Synthetic Chemical Industry Co., Ltd.) was applied to the photopolymerizable layer and dried at 40° C. for 20 minutes to form an oxygen barrier film.

The coated screen gauze was exposed to ultraviolet rays of 50 mJ/cm² through a negative mask having a fine line pattern having an image area to nonimage area (opening) ratio of 9:1, immersed in water for 2 minutes, and then sprayed with water under a spray pressure of 4 kg/cm². After drying at 40° C. for 20 minutes, the screen was post-exposed to ultraviolet rays of 200 mJ/cm² to complete a screen printing plate. No pattern defects, such as pinholes in the image area and scum on the nonimage area, was observed. The resulting screen printing plate was able to produce 10,000 prints on a screen printing machine for printing paste.

The photopolymerizable resin composition containing the modified cellulose compound according to the present invention has improved elasticity and flexibility and satisfactory adhesion to a substrate. Further, the modified cellulose compound has liability to decomposition and volatilization even after being baked. Therefore, it is suited as an ultraviolet curing coating or a photoresist for screen printing and lift-off or for use in the formation of priming ribs of PDP, resisting patterns or conductive patterns.

While the invention has been described in detail and with reference to specific examples thereof, it will be apparent to one skilled in the art that various changes and modifications can be made therein without departing from the spirit and scope thereof.

What is claimed is:

1. A modified cellulose compound having a weight average molecular weight of 8,000 to 500,000 obtained by reacting a hydroxyl group of cellulose or a cellulose derivative with an isocyanate group of a compound represented by formula (I):

$$CH_2=CR^1-COO-R^2-NCO \qquad (I)$$

wherein $R^1$ represents a hydrogen atom or a methyl group; and $R^2$ represents an alkylene group having 1 to 5 carbon atoms which may have alkyl group(s) as side chain(s), and wherein the reaction is effected such that the isocyanate group is from 0.1 to 0.8 equivalent per one equivalent of the hydroxyl group.

2. The modified cellulose compound of claim 1, which has a weight average molecular weight of 10,000 to 300,000.

3. A photopolymerizable resin composition comprising (a) a modified cellulose compound having a weight average molecular weight of 8,000 to 500,000 obtained by reacting a hydroxyl group of cellulose or a cellulose derivative with an isoscyante group of a compound represented by formula (I):

$$CH_2=CR^1-COO-R^2-NCO \qquad (I)$$

wherein $R^1$ represents a hydrogen atom or a methyl group; and $R^2$ represents an alkylene group having 1 to 5 carbon atoms which may have alkyl group(s) as side chain(s), (b) a photopolymerization initiator and (d) inorganic powder.

4. The photopolymerizable resin composition of claim 3, which further comprises (c) an ethylenic compound.

5. The photopolymerizable resin composition of claim 4, wherein the modified cellulose compound has a weight average molecular weight of 10,000 to 300,000.

6. A photomerizable resin composition comprising (a) a modified cellulose compound obtained by reacting a hydroxyl group of cellulose or a cellulose derivative with an isocyanate group of a compound represented by formula (I):

$$CH_2=CR^1-COO-R^2-NCO \qquad (I)$$

wherein $R^1$ represents a hydrogen atom or a methyl group; and $R^2$ represents an alkylene group having 1 to 5 carbon atoms which may have alkyl group(s) as side chains(s), and (b) a photopolymerization initiator, and wherein the modified cellulose compound has a weight average molecular weight of 8,000 to 500,000 and the reaction is effective such that the isocyanate group is from 0.1 to 0.8 equivalent per one equivalent of the hydroxyl group.

7. The photopolymerizable resin composition of claim 6, wherein the modified cellulose compound has a weight average molecular weight of 10,000 to 300,000.

8. The polymerizable resin composition of claim 6, which further comprises (c) an ethylenic compound.

* * * * *